US012803981B2

(12) United States Patent
Chen et al.

(10) Patent No.: US 12,803,981 B2
(45) Date of Patent: Nov. 17, 2026

(54) METHOD AND DEVICE FOR AUTHENTICATING AND AUTHORIZING AI FUNCTION IN CORE NETWORK

(71) Applicant: Beijing Xiaomi Mobile Software Co., Ltd., Beijing (CN)

(72) Inventors: Dong Chen, Beijing (CN); Yuze Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 56 days.

(21) Appl. No.: 18/866,015

(22) PCT Filed: May 18, 2022

(86) PCT No.: PCT/CN2022/093694

§ 371 (c)(1),
(2) Date: Nov. 14, 2024

(87) PCT Pub. No.: WO2023/221000

PCT Pub. Date: Nov. 23, 2023

(65) Prior Publication Data

US 2025/0310330 A1 Oct. 2, 2025

(51) Int. Cl.
*H04L 9/40* (2022.01)

(52) U.S. Cl.
CPC ...... *H04L 63/0892* (2013.01); *H04L 63/0853* (2013.01)

(58) Field of Classification Search
CPC .......... H04L 9/50; H04L 9/3213; G06Q 20/10
See application file for complete search history.

(56) References Cited

U.S. PATENT DOCUMENTS

| | | | | |
|---|---|---|---|---|
| 12,563,394 | B2 * | 2/2026 | Rohini | H04W 12/069 |
| 2018/0041479 | A1 * | 2/2018 | Wang | H04L 63/0838 |
| 2022/0014942 | A1 * | 1/2022 | Ying | H04W 24/02 |
| 2022/0038349 | A1 * | 2/2022 | Li | G06N 3/045 |

(Continued)

FOREIGN PATENT DOCUMENTS

| | | | |
|---|---|---|---|
| CN | 114091679 | A | 2/2022 |
| WO | 2021128110 | A1 | 7/2021 |

OTHER PUBLICATIONS

"3GPP TSGS-SA Procedures for the 5G System (5GS) Stage2 (Release 16)," 3GPP TS 23.502, v16.12.0, Mar. 31, 2022, 615 pages.

*Primary Examiner* — Lynn D Feild
*Assistant Examiner* — Vladimir I Gavrilenko
(74) *Attorney, Agent, or Firm* — McCoy Russell LLP

(57) ABSTRACT

The embodiments of the present application disclose A method and device for authenticating and authorizing_an AI function in a core network, which can be performed by the technical field of communications. The method comprises: an AMF network element sends an authentication and authorization request to an AAA-S network element, wherein the authentication and authorization request comprises a first identifier of a specified terminal device and first AI function auxiliary information; and receives an authentication and authorization response returned by the AAA-S network element, wherein the authentication and authorization response comprises an authentication and authorization result that is used to indicate whether the specified terminal device is allowed to use an AI function corresponding to the first AI function auxiliary information.

12 Claims, 7 Drawing Sheets

(56) References Cited

U.S. PATENT DOCUMENTS

| | | | | |
|---|---|---|---|---|
| 2023/0021215 | A1* | 1/2023 | Hu | H04W 12/06 |
| 2023/0389057 | A1* | 11/2023 | Deenoo | H04L 1/0019 |
| 2024/0073691 | A1* | 2/2024 | Lehtovirta | H04W 12/106 |
| 2024/0080662 | A1* | 3/2024 | Suh | H04W 12/041 |
| 2024/0241817 | A1* | 7/2024 | Tahvili | H04W 24/06 |
| 2025/0008325 | A1* | 1/2025 | Salkintzis | H04W 12/06 |
| 2025/0016547 | A1* | 1/2025 | Wang | G06N 3/08 |
| 2025/0142398 | A1* | 5/2025 | Luo | H04W 28/0252 |
| 2025/0193663 | A1* | 6/2025 | Long | H04W 12/08 |

* cited by examiner

METHOD AND DEVICE FOR AUTHENTICATING AND AUTHORIZING AI FUNCTION IN CORE NETWORK

CROSS-REFERENCE TO RELATED APPLICATION

The present application is a U.S. National Phase of International Patent Application No. PCT/CN2022/093694 filed on May 18, 2022. The contents of the above-cited application are hereby incorporated by reference for all purposes.

BACKGROUND OF THE INVENTION

Artificial Intelligence (AI) is a new technical science that studies and develops theories, methods, technologies, and application systems used to simulate, extend and expand human intelligence. At present, the typical application scenarios of 6th generation mobile networks (6G) and AI overlap by more than 80%, and the two are deeply integrated.

SUMMARY OF THE INVENTION

Examples of the disclosure disclose a method and device for authenticating and authorizing an AI function in a core network.

In a first aspect, an example of the disclosure discloses a method for authenticating and authorizing an AI function in a core network. The method is performed by an AMF network element. The method includes: sending an authentication and authorization request to an AAA-S network element, where the authentication and authorization request includes a first identifier of a specified terminal device and first AI function auxiliary information; and receiving an authentication and authorization response returned by the AAA-S network element, where the authentication and authorization response includes an authentication and authorization result that is used to indicate whether the specified terminal device is allowed to use an AI function corresponding to the first AI function auxiliary information.

In one implementation, the authentication and authorization request further includes an EAP identity response of the specified terminal device that is used to authenticate the specified terminal device.

In one implementation, before sending an authentication and authorization request to an AAA-S network element, the method further includes: sending a first message to at least one candidate terminal device, where the first message includes an EAP identity request and the first AI function auxiliary information; and the at least one candidate terminal device includes the specified terminal device; and receiving a second message returned by the specified terminal device, where the second message includes the EAP identity response of the specified terminal device, the first identifier, and the first AI function auxiliary information.

In one implementation, the first message and the second message are NAS MM transport messages.

In one implementation, sending the authentication and authorization request to the AAA-S network element includes: sending an AIAA_Authenticate request to an AIAAF network element, where the AIAA_Authenticate request includes the first identifier and the first AI function auxiliary information, where the first AI function auxiliary information includes an address of the AAA-S network element that is used to indicate the AIAAF network element to send the authentication and authorization request to the AAA-S network element according to the address.

In one implementation, receiving the authentication and authorization response returned by the AAA-S network element includes: receiving a third message returned by the AAA-S network element, where the third message includes the authentication and authorization result, a second identifier and second AI function auxiliary information; and determining the third message as the authentication and authorization response when the second identifier and the first identifier are consistent and the second AI function auxiliary information and the first AI function auxiliary information are consistent.

In a second aspect, an example of the disclosure discloses another method for authenticating and authorizing an AI function in a core network. The method is performed by an AAA-S network element. The method includes: receiving an authentication and authorization request sent by an AMF network element, where the authentication and authorization request includes a first identifier of a specified terminal device and first AI function auxiliary information; and sending an authentication and authorization response to the AMF network element, where the authentication and authorization response includes an authentication and authorization result that is used to indicate whether the specified terminal device is allowed to use an AI function corresponding to the first AI function auxiliary information.

In one implementation, the authentication and authorization request further includes an EAP identity response of the specified terminal device that is used to authenticate the specified terminal device.

In one implementation, receiving the authentication and authorization request sent by the AMF network element includes: receiving the authentication and authorization request sent by an AIAAF network element, where the authentication and authorization request is sent by the AIAAF network element according to an AIAA_Authenticate request received from the AMF network element; and the AIAA_Authenticate request includes the first identifier and the first AI function auxiliary information, and the first AI function auxiliary information includes an address of the AAA-S network element that is used to indicate the AIAAF network element to send the authentication and authorization request to the AAA-S network element according to the address.

In one implementation, sending the authentication and authorization response to the AMF network element includes: sending a third message to the AMF network element, where the third message includes the authentication and authorization result, the first identifier and the first AI function auxiliary information.

In one implementation, the method further includes: sending a fourth message to the specified terminal device, where the fourth message includes an EAP identity authentication request, the first identifier, and the first AI function auxiliary information; receiving a fifth message returned by the specified terminal device, where the fifth message includes an EAP identity authentication response, the first identifier and the first AI function auxiliary information; and determining, according to the EAP identity authentication response, whether the specified terminal device is allowed to use the AI function corresponding to the first AI function auxiliary information.

In one implementation, the method further includes: storing an association relationship among the first identifier, the first AI function auxiliary information, and the authentication and authorization result.

In a third aspect, an example of the disclosure discloses another method for authenticating and authorizing an AI function in a core network. The method is performed by a terminal device. The method includes: receiving a first message sent by an AMF network element, where the first message includes an EAP identity request and first AI function auxiliary information; returning a second message to the AMF network element, where the second message includes a first identifier of the terminal device, an EAP identity response and the first AI function auxiliary information; and the EAP identity response is used to authenticate the terminal device; and receiving a sixth message sent by the AMF network element, where the sixth message includes an authentication and authorization result that is used to indicate whether the specified terminal device is allowed to use an AI function corresponding to the first AI function auxiliary information.

In one implementation, the first message and the second message are NAS MM transport messages.

In one implementation, the method further includes: receiving a fourth message sent by an AAA-S network element, where the fourth message includes an EAP identity authentication request, the first identifier, and the first AI function auxiliary information; and returning a fifth message to the AAA-S network element, where the fifth message includes an EAP identity authentication response, the first identifier and the first AI function auxiliary information; and the EAP identity authentication response is used to determine whether the terminal device is allowed to use the AI function corresponding to the first AI function auxiliary information.

In a fourth aspect, an example of the disclosure provides a device for authenticating and authorizing an AI function in a core network, which is performed by an AMF network element. The device has some or all functions of the method described in the first aspect above. For example, the functions of the device for authenticating and authorizing an AI function in a core network may have some or all functions of the examples of the disclosure, or may also have the function to independently implement any example of the disclosure. The function may be implemented by software or may be implemented by software executed by hardware. The hardware or software includes one or more units or modules corresponding to the above function.

In one implementation, the structure of the device for authenticating and authorizing an AI function in a core network may include a transceiver module and a processing module, and the processing module is configured to support the device for authenticating and authorizing an AI function in a core network to perform the corresponding functions in the above method. The transceiver module is used to support the device for authenticating and authorizing an AI function in a core network to communicate with other devices. The device for authenticating and authorizing an AI function in a core network may further include a storage module, which is used to couple with the transceiver module and the processing module and stores necessary computer programs and data for the device for authenticating and authorizing an AI function in a core network.

As an example, the processing module may be a processor, the transceiver module may be a transceiver or a communication interface, and the storage module may be a memory.

In a fifth aspect, an example of the disclosure provides a device for authenticating and authorizing an AI function in a core network, which is performed by an AAA-S network element. The device has some or all functions of the method described in the second aspect above. For example, the functions of the device for authenticating and authorizing an AI function in a core network may have some or all functions of the examples of the disclosure, or may also have the function to independently implement any example of the disclosure. The function may be implemented by software or may be implemented by software executed by hardware. The hardware or software includes one or more units or modules corresponding to the above function.

In one implementation, the structure of the device for authenticating and authorizing an AI function in a core network may include a transceiver module and a processing module, and the processing module is configured to support the device for authenticating and authorizing an AI function in a core network to perform the corresponding functions in the above method. The transceiver module is used to support the device for authenticating and authorizing an AI function in a core network to communicate with other devices. The device for authenticating and authorizing an AI function in a core network may further include a storage module, which is used to couple with the transceiver module and the processing module and stores necessary computer programs and data for the device for authenticating and authorizing an AI function in a core network.

As an example, the processing module may be a processor, the transceiver module may be a transceiver or a communication interface, and the storage module may be a memory.

In a sixth aspect, an example of the disclosure provides a device for authenticating and authorizing an AI function in a core network, which is applied to a terminal device. The device has some or all functions of the method described in the third above. For example, the functions of the device for authenticating and authorizing an AI function in a core network may have some or all functions of the examples of the disclosure, or may also have the function to independently implement any example of the disclosure. The function may be implemented by software or may be implemented by software executed by hardware. The hardware or software includes one or more units or modules corresponding to the above function.

In one implementation, the structure of the device for authenticating and authorizing an AI function in a core network may include a transceiver module and a processing module, and the processing module is configured to support the device for authenticating and authorizing an AI function in a core network to perform the corresponding functions in the above method. The transceiver module is used to support the device for authenticating and authorizing an AI function in a core network to communicate with other devices. The device for authenticating and authorizing an AI function in a core network may further include a storage module, which is used to couple with the transceiver module and the processing module and stores necessary computer programs and data for the device for authenticating and authorizing an AI function in a core network.

As an example, the processing module may be a processor, the transceiver module may be a transceiver or a communication interface, and the storage module may be a memory.

In a seventh aspect, an example of the disclosure provides a communication device, where the communication device includes a processor, and when the processor invokes a computer program in a memory, the method described in the first aspect above or the method described in the second aspect above is performed.

In an eighth aspect, an example of the disclosure provides a communication device, where the communication device includes a processor, and when the processor invokes a computer program in a memory, the method described in the third aspect above is performed.

In a ninth aspect, an example of the disclosure provides a communication device, the communication device includes a processor and a memory, the memory has a computer program stored, and the processor executes the computer program stored in the memory, such that the communication device implements the method described in the first aspect above, or the method described in the second aspect above.

In a tenth aspect, an example of the disclosure provides a communication device, the communication device includes a processor and a memory, the memory has a computer program stored, and the processor executes the computer program stored in the memory, such that the communication device implements the method described in the third aspect above.

In an eleventh aspect, an example of the disclosure provides a communication device, the device includes a processor and an interface circuit, the interface circuit is used to receive code instructions and transmit the code instructions to the processor, and the processor is used to run the code instructions, such that the device implements the method described in the first aspect above or the method described in the second aspect above.

In a twelfth aspect, an example of the disclosure provides a communication device, the device includes a processor and an interface circuit, the interface circuit is used to receive code instructions and transmit the code instructions to the processor, and the processor is used to run the code instructions, such that the device implements the method described in the third aspect above.

In a thirteenth aspect, an example of the disclosure provides a communication system, the system includes the communication device described in the seventh aspect and the communication device described in the eighth aspect, or the system includes the communication device described in the ninth aspect and the communication device described in the tenth aspect, or the system includes the communication device described in the eleventh aspect and the communication device described in the twelfth aspect.

In a fourteenth aspect, an example of the present invention provides a non-transitory computer-readable storage medium used to store instructions for a network device above, and when the instructions are executed, the network device performs the method described in the first aspect above or the method described in the second aspect above.

In a fifteenth aspect, an example of the present invention provides a non-transitory readable storage medium used to store instructions for a terminal device above, and when the instructions are executed, the terminal device performs the method described in the third aspect above.

In a sixteenth aspect, the disclosure further provides a computer program product including a computer program, where the computer program, when executed by a computer, causes the computer to perform the method described in the first aspect above or the method described in the second aspect above.

In a seventeenth aspect, the disclosure further provides a computer program product including a computer program, where the computer program, when executed by a computer, causes the computer to perform the method described in the third aspect above.

In an eighteenth aspect, the disclosure provides a chip system, where the chip system includes at least one processor and an interface, and is used to support a network device to implement the function involved in the first aspect or the function involved in the second aspect, for example, to determine or process at least one of data and information involved in the above method. In one possible design, the chip system further includes a memory, and the memory is used to store necessary computer programs and data for a terminal device. The chip system may include a chip, or may also include a chip and other discrete devices.

In a nineteenth aspect, the disclosure provides a chip system, where the chip system includes at least one processor and an interface, and is used to support a terminal device to implement the function involved in the third aspect, for example, to determine or process at least one of data and information involved in the above method. In one possible design, the chip system further includes a memory, and the memory is used to store necessary computer programs and data for a network device. The chip system may include a chip, or may also include a chip and other discrete devices.

In a twentieth aspect, the disclosure provides a computer program, where the computer program, when executed by a computer, causes the computer to perform the method described in the first aspect above or the method described in the second aspect above.

In a twenty-first aspect, the disclosure provides a computer program, where the computer program, when executed by a computer, causes the computer to perform the method described in the third aspect above.

BRIEF DESCRIPTION OF DRAWINGS

In order to more clearly illustrate technical solutions in examples of the disclosure or in the background art, accompanying drawings used in the examples of the disclosure or the background art will be explained below.

DETAILED DESCRIPTION OF THE INVENTION

For ease of understanding, the terms involved in the disclosure are first introduced.

1. Artificial Intelligence (AI)

AI is a new technical science that studies and develops theories, methods, technologies and application systems used to simulate, extend and expand human intelligence.

2. 6th Generation Mobile Networks (6G)

The 6G network is a fully connected world where terrestrial wireless and satellite communications are integrated. By integrating satellite communications into 6G mobile communications to achieve seamless global coverage, network signals can reach any remote village. In addition, with the joint support of a global positioning system, a telecommunications satellite system, an Earth imaging satellite system, and a 6G ground network, the ground-to-air full-coverage network can also help humans predict the weather and quickly respond to natural disasters.

3. Access and Mobility Management Function (AMF) Network Element

The AMF network element performs registration, connectivity, accessibility, and mobility management. The AMF network element provides a session management message transmission channel for a terminal device and an SMF network element, and provides an authentication and authorization function for the terminal device during access. It is an access point for the terminal device and a wireless core network control plane.

4. Authentication and Authorization Server (AAA-S) Network Element

The AAA-S network element is used for performing authentication and authorization processing for the AI function and the like.

The various network elements/functions referred to in the examples of the present disclosure may be either an independent hardware device or a function implemented by a computer code within the hardware device, which are not limited to the examples of the present disclosure.

In order to better understand a method for authenticating and authorizing an AI function in a core network disclosed in the example of the disclosure, a communication system applicable to the example of the disclosure is first described below.

Figure 1:
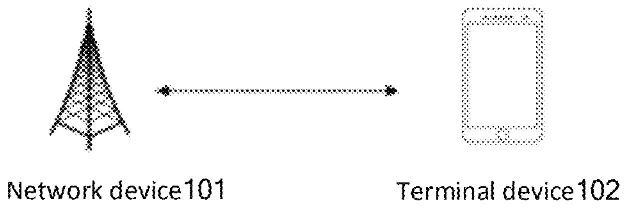
FIG. 1 is a schematic structural diagram of a communication system according to an example of the disclosure.

Referring to FIG. 1, FIG. 1 is a schematic structural diagram of a communication system according to an example of the disclosure. The communication system may include, but is not limited to, one network device and one terminal device. The number and shape of the devices shown in FIG. 1 are for example only and do not constitute a limitation of the example of the disclosure. In practical application, two or more network devices and two or more terminal devices may be included. The communication system shown in FIG. 1, including one network device 101 and one terminal device 102, is taken as an example.

It should be noted that the technical solution of the example of the disclosure may be applicable to various communication systems, for example, a long term evolution (LTE) system, a 5th generation (5G) mobile communication system, a 5G new radio (NR) system, a 6th generation (6G) mobile communication system or other future novel mobile communication system, etc.

The network device 101 in the example of the disclosure is an entity on the network side for transmitting or receiving signals. For example, the network device 101 may be an evolved NodeB (eNB), a transmission reception point (TRP), a next generation NodeB (gNB) in an NR system, a base station in other future mobile communication systems, an access node in a wireless fidelity (WiFi) system, etc. The example of the disclosure does not limit the specific technology and specific device form adopted by the network device. The network device provided in the example of the disclosure may be composed of a central unit (CU) and a distributed unit (DU), where the CU may also be called a control unit. By the adoption of the structure of CU-DU, the network device, for example, a protocol layer of the base station, can be separated. Some of the functions of the protocol layer are centrally controlled by the CU, and the remaining part or all of the functions of the protocol layer are distributed in the DU, and the DU is centrally controlled by the CU.

The terminal device 102 in the example of the disclosure is an entity on the user side for receiving or transmitting signals, such as a mobile phone. The terminal device may also be called a terminal, user equipment (UE), a mobile station (MS), a mobile terminal (MT), etc. The terminal device may be a vehicle with a communication function, a smart car, a mobile phone, a wearable device, a pad, a computer with a wireless receiving and sending function, a virtual reality (VR) terminal device, an augmented reality (AR) terminal device, a wireless terminal device in industrial control, a wireless terminal device in self-driving, a wireless terminal device in remote medical surgery, a wireless terminal device in a smart grid, a wireless terminal device in transportation safety, a wireless terminal device in a smart city, a wireless terminal device in a smart home, etc. The example of the disclosure does not limit the specific technology and specific device form adopted by the terminal device.

Artificial Intelligence (AI) is a new technical science that studies and develops theories, methods, technologies, and application systems used to simulate, extend, and expand human intelligence. At present, the typical application scenarios of 6th generation mobile networks (6G) and AI overlap by more than 80%, and the two are deeply integrated.

The current AI function is a simple overlay on the process of a 6G network, which is an external application. Thus, it is possible to consider adding the AI function to the core network architecture of 6G as an independent network element, which is closely coupled with other network elements to provide reliable and systematic AI function services. Thus, it is necessary to perform authentication and authorization processing on the AI function. However, the authentication and authorization process of the AI function is currently lacking.

In view of this, in this example of the disclosure provides a method for authenticating and authorizing an AI function in a core network, which can be performed by the technical field of communications, so as to send an authentication and authorization request to an AAA-S network element, where the authentication and authorization request includes a first identifier of a specified terminal device and first AI function auxiliary information; and receive an authentication and authorization response returned by the AAA-S network element, thus, the authentication and authorization of the AI function in the core network are achieved. The terminal device can conveniently use the services of the AI function in the core network.

In the technical solution, the authentication and authorization request is sent to the AAA-S network element, where the authentication and authorization request includes the first identifier of the specified terminal device and the first AI function auxiliary information; and the authentication and authorization response returned by the AAA-S network element is received, where the authentication and authorization response includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

In the technical solution, the authentication and authorization request sent by the AMF network element is received, where the authentication and authorization request includes the first identifier of the specified terminal device and the first AI function auxiliary information. The authentication and authorization response is sent to the AMF network element, where the authentication and authorization response includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

In the technical solution, the first message sent by the AMF network element is received, where the first message includes the EAP identity request and the first AI function auxiliary information; the second message is returned to the AMF network element, where the second message includes the first identifier of the terminal device, the EAP identity response and the first AI function auxiliary information; and the EAP identity response is used to authenticate the terminal device; and the sixth message sent by the AMF network element is received, where the sixth message includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

It may be understood that the communication system described in the example of the disclosure is to more clearly illustrate the technical solutions of the example of the disclosure, and does not constitute a limitation on the technical solutions provided by the example of the disclosure. It is known to those of ordinary skill in the art that with the evolution of the system architecture and the emergence of new business scenarios, the technical solutions provided by the example of the disclosure are also suitable for similar technical problems.

The following is a detailed introduction to a method and device for authenticating and authorizing an AI function in a core network provided by the disclosure in combination with the accompanying drawings.

Figure 2:
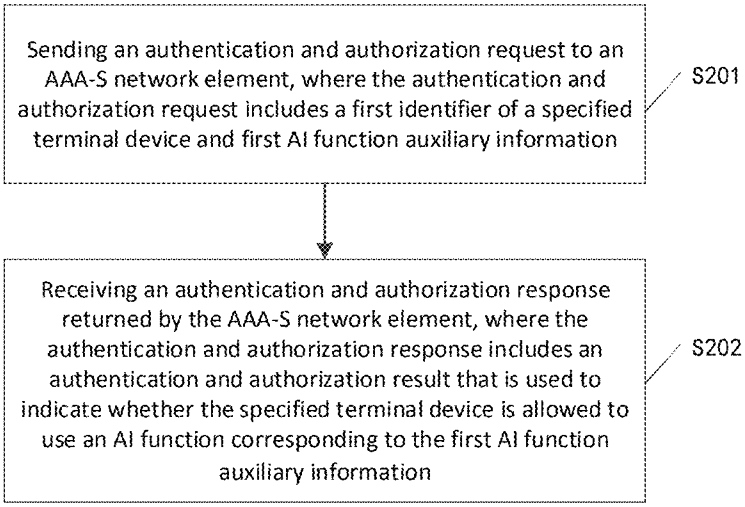
FIG. 2 is a flow schematic diagram of a method for authenticating and authorizing an AI function in a core network according to an example of the disclosure.

Referring to FIG. 2, FIG. 2 is a flow schematic diagram of a method for authenticating and authorizing an AI function in a core network according to an example of the disclosure. The method may be performed by the network device in FIG. 1, and specifically by an AMF network element.

As shown in FIG. 2, the method may include but is not limited to the following steps: S201 and S202.

In step S201, an authentication and authorization request is sent to an AAA-S network element, where the authentication and authorization request includes a first identifier of a specified terminal device and first AI function auxiliary information.

In this example of the disclosure, the AMF network element may communicate with at least one AI function network element to determine the AI function network element that requires authentication and authorization processing. Different AI function network elements implement different AI functions.

For the specific AI function implemented by the AI function network elements, some terminal devices may need to use the AI function, while others may not need to use the AI function. Thus, the AMF network element needs to initiate an authentication and authorization process for the specific AI function and a specific terminal device. The specific terminal device refers to a terminal device that needs to use the specific AI function. The specified terminal device is a terminal device that needs to use an AI function corresponding to the first AI function auxiliary information.

As an example, the first identifier of the specified terminal device may be a Generic Public Subscription Identifier (GPSI) of the specified terminal device, and is only used to identify the specified terminal device.

As an example, in order to facilitate the subsequent interaction between the AAA-S network element and the specified terminal device to determine whether the specified terminal device is allowed to use the AI function corresponding to the first AI function auxiliary information, the authentication and authorization request further includes: an Extensible Authentication Protocol (EAP) identity response of the specified terminal device, which is used to authenticate the specified terminal device. That is, after receiving the authentication and authorization request, the AAA-S network element can carry the EAP identity response in the interaction with the specified terminal device. When receiving a message carrying the EAP identity response, the specified terminal device will receive and process the message. When receiving a message that does not carry the EAP identity response, the specified terminal device will ignore or not receive the message.

As an example, the process that the AMF network element sends the authentication and authorization request to the AAA-S network element may be, for example, that an AIAA_Authenticate Request is sent to an AIAAF network element, where the AIAA_Authenticate request includes the first identifier and the first AI function auxiliary information. The first AI function auxiliary information includes an address of the AAA-S network element and is used to indicate the AIAAF network element to send the authentication and authorization request to the AAA-S network element according to the address. As an example, the AIAA_Authenticate request may also include an EAP identity response of the specified terminal device.

When receiving the AIAA_Authenticate request, an Artificial Intelligence Authentication and Authorization Function (AIAAF) network element acquires the address of the AAA-S network element included in the first AI function auxiliary information of the AIAA_Authenticate request, and sends the authentication and authorization request to the AAA-S network element according to the address. A plurality of AAA-S network elements may be provided, and different AI functions may correspond to different AAA-S network elements; that is, different AI functions may require different AAA-S network elements for authentication and authorization processing.

The AIAAF network element may send an AAA Protocol message to the AAA-S network element, where the AAA Protocol message carries the authentication and authorization request.

As an example, the AIAAF network element may transmit the AAA Protocol message to the AAA-S network element via an Authentication and Authorization Proxy (AAA-P) network element in an unvarnished transmission manner.

In step S202, an authentication and authorization response returned by the AAA-S network element is received, where the authentication and authorization response includes an authentication and authorization result that is used to indicate whether the specified terminal device is allowed to use the AI function corresponding to the first AI function auxiliary information.

As an example, the authentication and authorization response may further include: the first identifier and the first AI function auxiliary information. A third message returned by the AAA-S network element may be received by the AMF network element, where the third message includes the authentication and authorization result, a second identifier and second AI function auxiliary information. The third message is determined as the authentication and authorization response when the second identifier and the first identifier are consistent, and the second AI function auxiliary information and the first AI function auxiliary information are consistent. In addition, when the second identifier is inconsistent with the first identifier, or the second AI function auxiliary information is inconsistent with the first AI function auxiliary information, it is determined that the third message is not an authentication and authorization response for the above authentication and authorization request, may be an authentication and authorization response for an authentication and authorization request of other terminal device, or may be an authentication and authorization response for the specified terminal device and for the AI function corresponding to the second AI function auxiliary information.

As an example, the process that the third message returned by the AAA-S network element may be received by the AMF network element may be, for example, that the third message returned by the AIAAF network element is received by the AMF network element, where the third message is sent by the AAA-S network element to the AIAAF network element.

In this example of the disclosure, the AMF network element may directly communicate with the AAA-S network element to send the authentication and authorization request and receive the authentication and authorization response, and may also communicate with the AAA-S network element via other network devices. It should be noted that in all the steps of all examples of the disclosure, intermediate devices may be omitted in the expression, and only transmitting and receiving devices are defined. However, those skilled in the art may understand that this expression does not mean that the transmitting device must directly send information to the receiving device.

In one possible implementation, the AMF network element may interact with the AAA-S network element via the AIAAF network element and the AAA-P network element.

In another possible implementation, the AMF network element may directly interact with the AAA-S network element.

According to the authentication and authorization method for the AI function in the core network of the example of the disclosure, the AMF network element sends the authentication and authorization request to the AAA-S network element, where the authentication and authorization request includes the first identifier of the specified terminal device and the first AI function auxiliary information. The authentication and authorization response returned by the AAA-S network element is received, where the authentication and authorization response includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

It should be noted that these possible implementations may be performed individually or in combination, which are not limited to the example of the disclosure.

Figure 3:
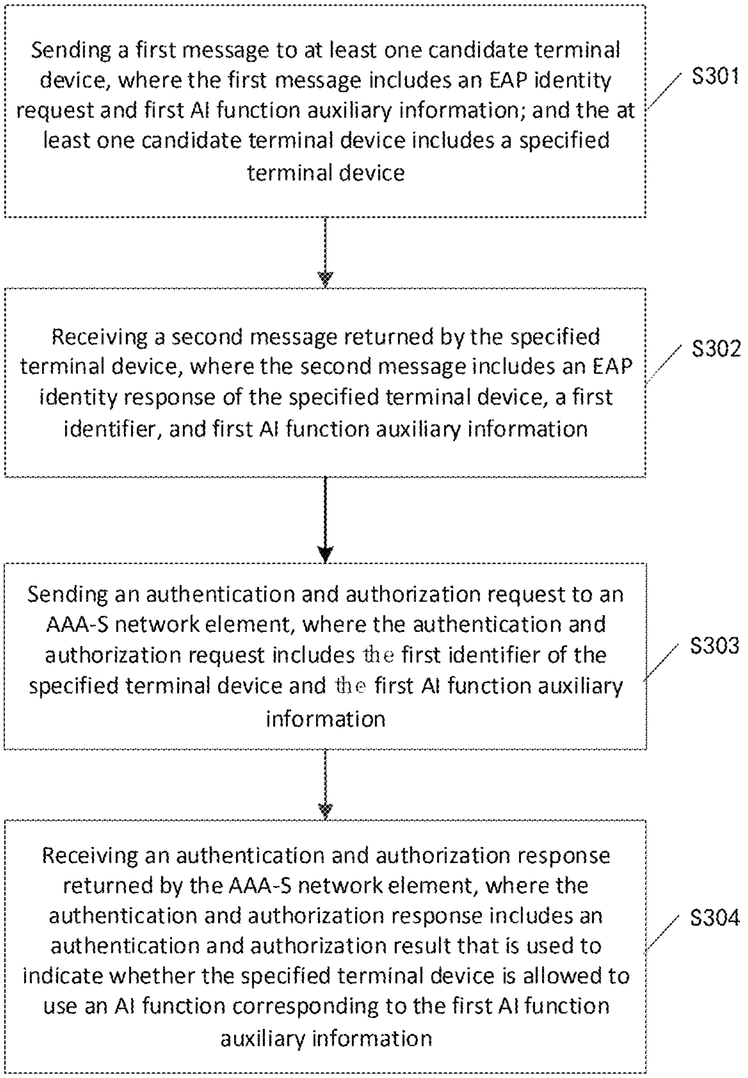
FIG. 3 is a flow schematic diagram of another method for authenticating and authorizing an AI function in a core network according to an example of the disclosure.

Referring to FIG. 3, FIG. 3 is a flow schematic diagram of another method for authenticating and authorizing an AI function in a core network according to an example of the disclosure. The method may be performed by the network device in FIG. 1, and specifically by an AMF network element.

The authentication and authorization method for the AI function in the core network may be performed alone, or in combination with any example of the disclosure or the possible implementation in the example, or in combination with any technical solution of the related art.

As shown in FIG. 3, the method may include but is not limited to the following steps: S301-S304.

In step S301, a first message is sent to at least one candidate terminal device, where the first message includes an EAP identity request and first AI function auxiliary information; and the at least one candidate terminal device includes a specified terminal device.

In this example of the disclosure, at least one candidate terminal device may be a terminal device communicating with the AMF network element via a Radio Access Network (RAN).

The first message may, for example, be a Non-Access Stratum (NAS) MM transport message.

In step S302, a second message returned by the specified terminal device is received, where the second message includes an EAP identity response of the specified terminal device, a first identifier, and the first AI function auxiliary information.

In this example of the disclosure, when it is determined that the specified terminal device needs to use an AI function corresponding to the first AI function auxiliary information, the specified terminal device returns the second message to the AMF network element, where the second message carries the EAP identity response of the specified terminal device, the first identifier and the first AI function auxiliary and indicates that the specified terminal device needs to use the AI function corresponding to the first AI function auxiliary information. In addition, when it is determined that the specified terminal device does not need to use the AI function corresponding to the first AI function auxiliary information, the specified terminal device may not return the second message.

The second message may, for example, be a Non-Access Stratum (NAS) MM transport message.

In step S303, an authentication and authorization request is sent to an AAA-S network element, where the authentication and authorization request includes the first identifier of the specified terminal device and the first AI function auxiliary information.

In step S304, an authentication and authorization response returned by the AAA-S network element is received, where the authentication and authorization response includes an authentication and authorization result that is used to indicate whether the specified terminal device is allowed to use the AI function corresponding to the first AI function auxiliary information.

In this example of the disclosure, steps S303 and S304 may be implemented by any one of the implementations of various examples of the disclosure, respectively, which are not limited to the example of the disclosure and are not described in detail.

According to the authentication and authorization method for the AI function in the core network of the example of the disclosure, the first message is sent to at least one candidate terminal device by the AMF network element, where the first message includes the EAP identity request and the first AI function auxiliary information; and the at least one candidate terminal device includes the specified terminal device; the second message returned by the specified terminal device is received, where the second message includes the EAP identity response of the specified terminal device, the first identifier, and the first AI function auxiliary information; the authentication and authorization request is sent to the AAA-S network element, where the authentication and authorization request includes the first identifier of the specified terminal device and the first AI function auxiliary information; and the authentication and authorization response returned by the AAA-S network element is received, where the authentication and authorization response includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

Figure 4:
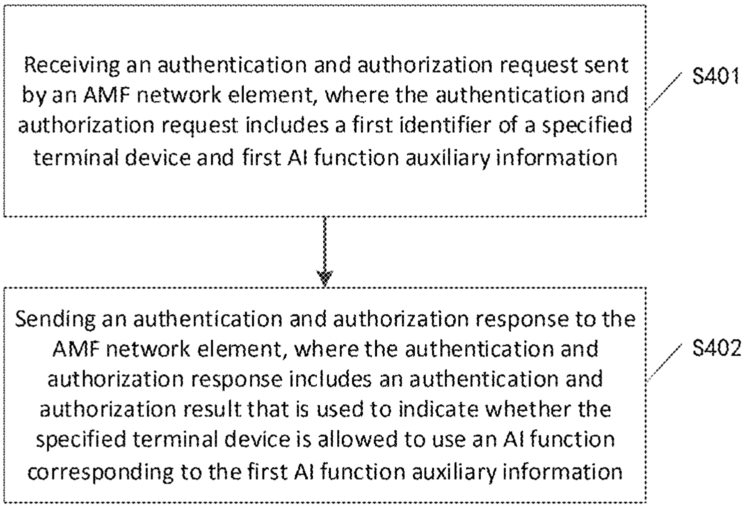
FIG. 4 is a flow schematic diagram of another method for authenticating and authorizing an AI function in a core network according to an example of the disclosure.

Referring to FIG. 4, FIG. 4 is a flow schematic diagram of another method for authenticating and authorizing an AI function in a core network according to an example of the disclosure. The method may be performed by the network device in FIG. 1, and specifically by an AAA-S network element.

The authentication and authorization method for the AI function in the core network may be performed alone, or in combination with any example of the disclosure or the possible implementation in the example, or in combination with any technical solution of the related art.

As shown in FIG. 4, the method may include, but is not limited to, the following steps: S401 and S402.

In step S401, an authentication and authorization request sent by an AMF network element is received, where the authentication and authorization request includes a first identifier of a specified terminal device and first AI function auxiliary information.

In this example of the disclosure, the specified terminal device may be a terminal device that communicates with the AMF network element and needs to use an AI function corresponding to the first AI function auxiliary information in at least one candidate terminal device.

As an example, the first identifier of the specified terminal device may be, for example, a Generic Public Subscription Identifier (GPSI) of the specified terminal device, and is only used to identify the specified terminal device.

As an example, in order to facilitate the subsequent interaction between the AAA-S network element and the specified terminal device to determine whether the specified terminal device is allowed to use the AI function corresponding to the first AI function auxiliary information, the authentication and authorization request further includes: an EAP identity response of the specified terminal device, which is used to authenticate the specified terminal device. That is, after receiving the authentication and authorization request, the AAA-S network element can carry the EAP identity response in the interaction with the specified terminal device. When receiving a message carrying the EAP identity response, the specified terminal device will receive and process the message. When receiving a message that does not carry the EAP identity response, the specified terminal device will ignore or not receive the message.

As an example, the process that the authentication and authorization request sent by the AMF network element is received by the AAA-S network element may be, for example, that an authentication and authorization request sent by an AIAAF network element is received, where the authentication and authorization request is sent by the AIAAF network element according to an AIAA_Authenticate request received from the AMF network element. The AIAA_Authenticate request includes the first identifier and the first AI function auxiliary information, and the first AI function auxiliary information includes: an address of the AAA-S network element that is used to indicate the AIAAF network element to send the authentication and authorization request to the AAA-S network element according to the address. As an example, the AIAA_Authenticate request may further include an EAP identity response of the specified terminal device.

When receiving the AIAA_Authenticate request, an AIAAF network element acquires the address of the AAA-S network element included in the first AI function auxiliary information of the AIAA_Authenticate request, and sends the authentication and authorization request to the AAA-S network element according to the address. A plurality of AAA-S network elements may be provided, and different AI functions may correspond to different AAA-S network elements; that is, different AI functions may require different AAA-S network elements for authentication and authorization processing.

The AAA-S network element may receive an AAA Protocol message sent by the AIAAF network element, where the AAA Protocol message carries the authentication and authorization request.

As an example, the AAA-S network element may receive the AAA Protocol message that is transmitted by the AIAAF network element via an AAA-P network element in an unvarnished transmission manner.

In step S402, an authentication and authorization response is sent to the AMF network element, where the authentication and authorization response includes an authentication and authorization result that is used to indicate whether the specified terminal device is allowed to use the AI function corresponding to the first AI function auxiliary information.

As an example, the AAA-S network element may send a third message to the AMF network element, where the third message includes the authentication and authorization result, the first identifier, and the first AI function auxiliary information, such that the AMF network element determines, according to the first identifier and the first AI function auxiliary information, whether the third message is an authentication and authorization response for the above authentication and authorization request.

As an example, the process that the AAA-S network element sends the third message to the AMF network element may be, for example, that the AAA-S network element sends the third message to the AIAAF network element, and the AIAAF network element sends the third message to the AMF network element.

The AAA-S network element may send an AAA Protocol message to the AIAAF network element, where the AAA Protocol message carries the third message.

As an example, the AAA-S network element may send the AAA Protocol message to the AIAAF network element via an AAA-P network element in an unvarnished transmission manner.

As an example, in a case where the authentication and authorization result indicates that the specified terminal device is allowed to use the AI function corresponding to the first AI function auxiliary information, the AAA-S network element can store an association relationship among the first identifier, the first AI function auxiliary information and the authentication and authorization result, and the AAA-S network element can conveniently trigger subsequent re-authentication and re-authorization based on local strategies and the like.

In this example of the disclosure, the AAA-S network element may directly communicate with the AMF network element to receive the authentication and authorization request and send the authentication and authorization response, and may also communicate with the AMF network element via other network devices. It should be noted that in all the steps of all examples of the disclosure, intermediate devices may be omitted in the expression, and only transmitting and receiving devices are defined. However, those skilled in the art may understand that this expression does not mean that the transmitting device must directly send information to the receiving device.

In one possible implementation, the AAA-S network element may interact with the AMF network element via the AAA-P network element and the AIAAF network element. In another possible implementation, the AAA-S network element may directly interact with the AMF network element.

According to the authentication and authorization method for the AI function in the core network of the example of the disclosure, the AAA-S network element receives the authentication and authorization request sent by the AMF network element, where the authentication and authorization request includes the first identifier of the specified terminal device and the first AI function auxiliary information. The authentication and authorization response is sent to the AMF network element, where the authentication and authorization response includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

It should be noted that these possible implementations may be performed individually or in combination, which are not limited to the example of the disclosure.

Figure 5:
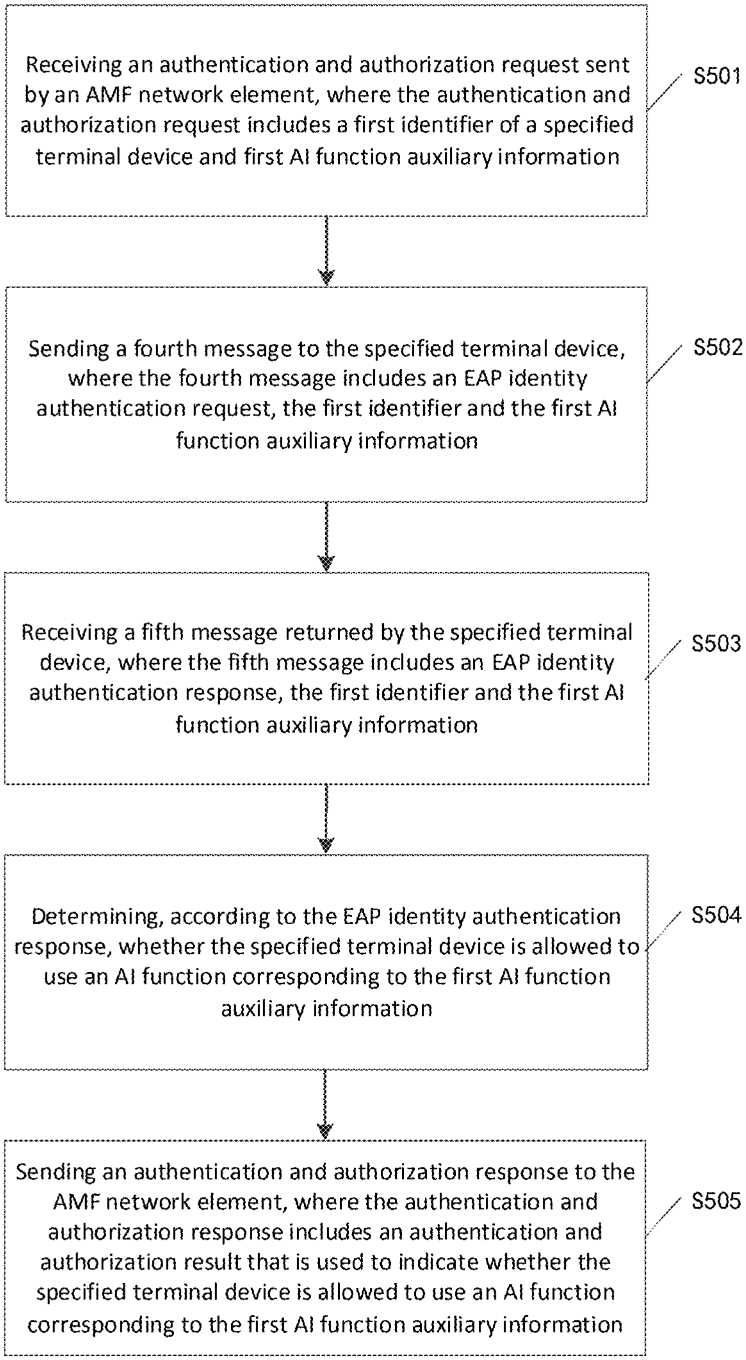
FIG. 5 is a flow schematic diagram of another method for authenticating and authorizing an AI function in a core network according to an example of the disclosure.

Referring to FIG. 5, FIG. 5 is a flow schematic diagram of another method for authenticating and authorizing an AI function in a core network according to an example of the disclosure. The method may be performed by the network device in FIG. 1, and specifically by an AAA-S network element.

The authentication and authorization method for the AI function in the core network may be performed alone, or in combination with any example of the disclosure or the possible implementation in the example, or in combination with any technical solution of the related art.

As shown in FIG. 5, the method may include, but is not limited to, the following steps: S501-S505.

In step S501, an authentication and authorization request sent by an AMF network element is received, where the authentication and authorization request includes a first identifier of a specified terminal device and first AI function auxiliary information.

In step S502, a fourth message is sent to the specified terminal device, where the fourth message includes an EAP identity authentication request, the first identifier and the first AI function auxiliary information.

In this example of the disclosure, as an example, the AAA-S network element may send the fourth message directly to the specified terminal device. As another example, the AAA-S network element may interact with the specified terminal device via an AAA-P network element, an AIAAF network element, and the AMF network element to send the fourth message.

As an example, the process that the AAA-S network element sends the fourth message to the specified terminal device may be, for example, that the AAA-S network element sends the fourth message to the AIAAF network element via unvarnished transmission of the AAA-P network element; the AIAAF network element sends the fourth message to the AMF network element; and the AMF network element sends the fourth message to the specified terminal device via an RAN.

In step S503, a fifth message returned by the specified terminal device is received, where the fifth message includes an EAP identity authentication response, the first identifier and the first AI function auxiliary information.

In this example of the disclosure, the EAP identity authentication response may be, for example, an EAP message. The EAP message may include parameters related to the specified terminal device using the first AI function auxiliary information, such as channel-related parameters, resource-related parameters, and hardware performance-related parameters of the specified terminal device, which can be selected based on actual needs and are not specifically limited here.

As an example, the process that the AAA-S network element receives the fourth message returned by the specified terminal device may be, for example, that the AAA-S network element receives the fifth message returned by the AIAAF network element via unvarnished transmission of the AAA-P network element, where the fifth message is sent to the AMF network element by the specified terminal device via the RAN and is sent to the AIAAF network element by the AMF network element.

In step S504, whether the specified terminal device is allowed to use an AI function corresponding to the first AI function auxiliary information is determined according to the EAP identity authentication response.

In step S505, an authentication and authorization response is sent to the AMF network element, where the authentication and authorization response includes an authentication and authorization result that is used to indicate whether the specified terminal device is allowed to use an AI function corresponding to the first AI function auxiliary information.

In this example of the disclosure, the authentication and authorization result may be, for example, an EAP result. If the EAP result succeeds, it indicates that the authentication and authorization succeed, that is, the specified terminal device is allowed to use the AI function corresponding to the first AI function auxiliary information. If the EAP result fails, it indicates that the authentication and authorization fail, that is, the specified terminal device is not allowed to use the AI function corresponding to the first AI function auxiliary information.

In this example of the disclosure, steps S501 and S505 may be implemented by any one of the implementations of various examples of the disclosure, respectively, which are not limited to the example of the disclosure and are not described in detail.

According to the authentication and authorization method for the AI function in the core network of the example of the disclosure, the AAA-S network element receives the authentication and authorization request sent by the AMF network element, where the authentication and authorization request includes the first identifier of the specified terminal device and the first AI function auxiliary information; the fourth message is sent to the specified terminal device, where the fourth message includes the EAP identity authentication request, the first identifier and the first AI function auxiliary information; the fifth message returned by the specified terminal device is received, where the fifth message includes the EAP identity authentication response, the first identifier and the first AI function auxiliary information; whether the specified terminal device is allowed to use the AI function corresponding to the first AI function auxiliary information is determined according to the EAP identity authentication response; and the authentication and authorization response is sent to the AMF network element, where the authentication and authorization response includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

Figure 6:
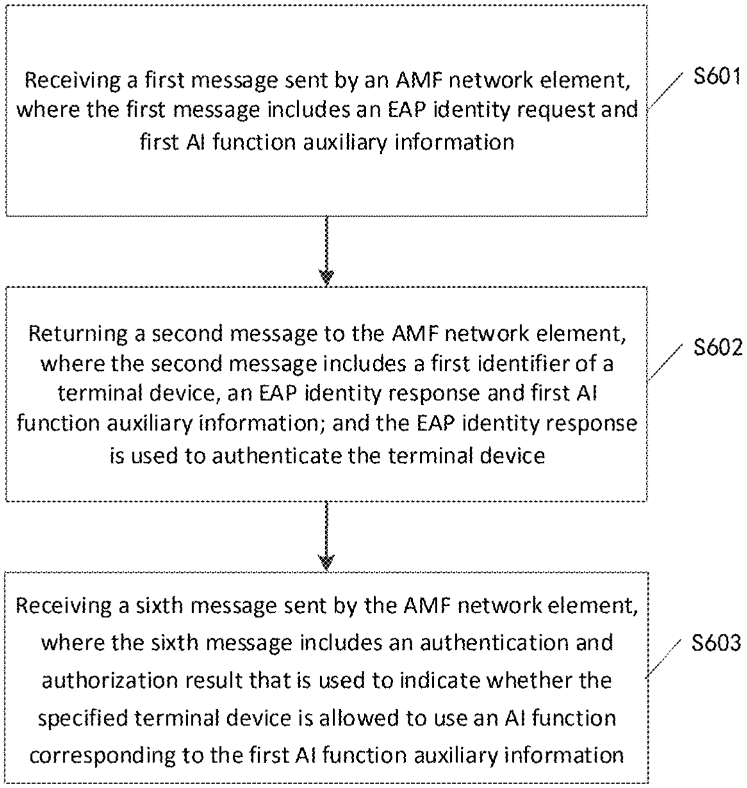
FIG. 6 is a flow schematic diagram of another method for authenticating and authorizing an AI function in a core network according to an example of the disclosure.

Referring to FIG. 6, FIG. 6 is a flow schematic diagram of a method for authenticating and authorizing an AI function in a core network according to an example of the disclosure. The method may be performed by the terminal device in FIG. 1.

As shown in FIG. 6, the method may include, but is not limited to, the following steps: S601-S603.

In step S601, a first message sent by an AMF network element is received, where the first message includes an EAP identity request and first AI function auxiliary information. In all examples of the present disclosure, the terminal device may be connected to various network elements or devices of a core network in the examples of the present disclosure via an access network device. In some possible implementations, the terminal device may also be connected to various network elements or devices of the core network by any feasible means, which are not specifically limited to the examples of the present disclosure. Of course, no matter which method of connection is used, as long as the data communication between the terminal device and the network element or device of the core network can be achieved, it is called sending/receiving.

In this example of the disclosure, the terminal device may be one of at least one candidate terminal device communicating with the AMF network element. That is, at least one candidate terminal device communicating with the AMF network element can receive the first message sent by the AMF network element. The AMF network element may communicate with at least one AI function network element to determine the AI function network element that requires authentication and authorization processing.

As an example, the terminal device may receive the first message sent by the AMF network element via the RAN.

The first message may, for example, be an NAS MM transport message.

In step S602, a second message is returned to the AMF network element, where the second message includes a first identifier of the terminal device, an EAP identity response and first AI function auxiliary information; and the EAP identity response is used to authenticate the terminal device.

In this example of the disclosure, for an AI function corresponding to the first AI function auxiliary information, if the terminal device needs to use the AI function, the second message is returned to the AMF network element. If the terminal device does not need to use the AI function, it does not need to return the second message to the AMF network element. At least one terminal device in the at least one candidate terminal device needs to use the AI function.

The EAP identity response is used to authenticate the terminal device; that is, interaction between an AAA-S network element and the specified terminal device is facilitated to determine whether the specified terminal device is allowed to use the AI function corresponding to the first AI function auxiliary information. That is, the AAA-S network element can carry the EAP identity response in the subsequent interaction with the terminal device. When receiving a message carrying the EAP identity response, the specified terminal device will receive and process the message. When receiving a message that does not carry the EAP identity response, the specified terminal device will ignore or not receive the message.

The second message may, for example, be an NAS MM transport message.

In step S603, a sixth message sent by the AMF network element is received, where the sixth message includes an authentication and authorization result that is used to indicate whether the specified terminal device is allowed to use the AI function corresponding to the first AI function auxiliary information.

As an example, the terminal device may receive the sixth message sent by the AMF network element via the RAN.

According to the authentication and authorization method for the AI function in the core network, the first message sent by the AMF network element is received by the terminal device, where the first message includes the EAP identity request and the first AI function auxiliary information; the second message is returned to the AMF network element, where the second message includes the first identifier of the terminal device, the EAP identity response and the first AI function auxiliary information; and the EAP identity response is used to authenticate the terminal device; and the sixth message sent by the AMF network element is received, where the sixth message includes the authentication and authorization result that is used to indicate whether the specified terminal device is allowed to use the AI function corresponding to the first AI function auxiliary information. Thus, the authentication and authorization of the AI function in the core network are achieved, and the terminal device can conveniently use the services of the AI function in the core network.

It should be noted that these possible implementations may be performed individually or in combination, which are not limited to the example of the disclosure.

Figure 7:
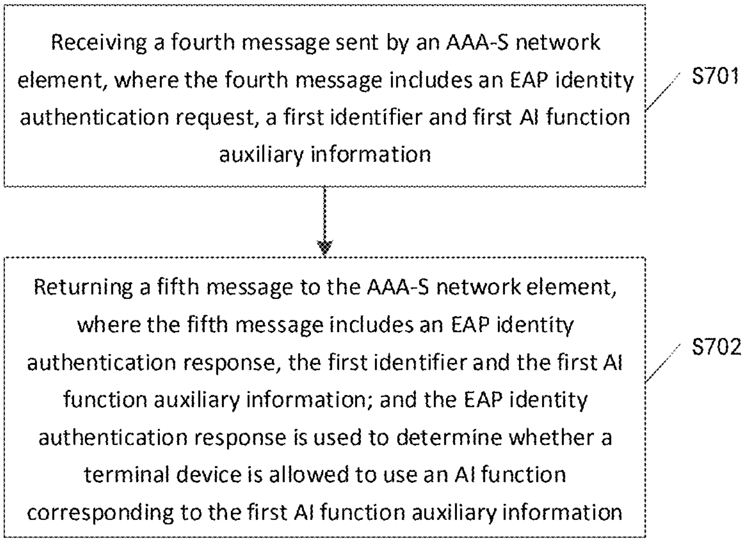
FIG. 7 is a flow schematic diagram of another method for authenticating and authorizing an AI function in a core network according to an example of the disclosure.

Referring to FIG. 7, FIG. 7 is a flow schematic diagram of another method for authenticating and authorizing an AI function in a core network according to an example of the disclosure. The method may be performed by the terminal device in FIG. 1.

The authentication and authorization method for the AI function in the core network may be performed alone, or in combination with any example of the disclosure or the possible implementation in the example, or in combination with any technical solution of the related art.

As shown in FIG. 7, the method may include, but is not limited to, the following steps: S701 and S702.

In step S701, a fourth message sent by an AAA-S network element is received, where the fourth message includes an EAP identity authentication request, a first identifier and first AI function auxiliary information.

In this example of the disclosure, in a case where the terminal device needs to use the AI function corresponding to the first AI function auxiliary information, and the terminal device returns the second message for the first message of the AMF network element, the terminal device may receive the fourth message sent by the AAA-S network element. The first message includes an EAP identity request and the first AI function auxiliary information; the second message includes a first identifier of the terminal device, an EAP identity response and the first AI function auxiliary information; and the EAP identity response is used to authenticate the terminal device.

In this example of the disclosure, as an example, the terminal device may directly receive the fourth message sent by the AAA-S network element. As another example, the terminal device may interact with the AAA-S network element via an AMF network element, an AIAAF network element, and an AAA-P network element to receive the fourth message.

As an example, the process that the terminal device receives the fourth message returned by the AAA-S network element may be, for example, that the terminal device receives the fourth message sent by the AMF network element via an RAN, where the fourth message is sent to the AIAAF network element by the AAA-S network element via unvarnished transmission of the AAA-P network element and is sent to the AMF network element by the AIAAF network element.

In step S702, a fifth message is returned to the AAA-S network element, where the fifth message includes an EAP identity authentication response, the first identifier and the first AI function auxiliary information; and the EAP identity authentication response is used to determine whether the terminal device is allowed to use an AI function corresponding to the first AI function auxiliary information.

In this example of the disclosure, the EAP identity authentication response may be, for example, an EAP message. The EAP message may include parameters related to the specified terminal device using the first AI function auxiliary information, such as channel-related parameters, resource-related parameters, and hardware performance-related parameters of the specified terminal device, which can be selected based on actual needs and are not specifically limited here.

As an example, the process that the terminal device returns the fifth message to the AAA-S network element may be, for example, that the terminal device sends the fifth message to the AMF network element via the RAN; the fifth message is sent to the AIAAF network element by the AAA-S network element; and the fifth message is sent to the AAA-S network element by the AIAAF network element via unvarnished transmission of the AAA-P network element.

After receiving the fifth message, the AAA-S network element can determine, according to the EAP identity authentication response in the fifth message, whether the terminal device is allowed to use the AI function corresponding to the first AI function auxiliary information.

According to the authentication and authorization method for the AI function in the core network, the fourth message sent by the AAA-S network element is received by the terminal device, where the fourth message includes the EAP identity authentication request, the first identifier and the first AI function auxiliary information; and the fifth message is returned to the AAA-S network element, where the fifth message includes the EAP identity authentication response, the first identifier and the first AI function auxiliary information; and the EAP identity authentication response is used to determine whether the terminal device is allowed to use the AI function corresponding to the first AI function auxiliary information. Thus, the authentication and authorization of the AI function in the core network are achieved, and the terminal device can conveniently use the services of the AI function in the core network.

Figure 8:
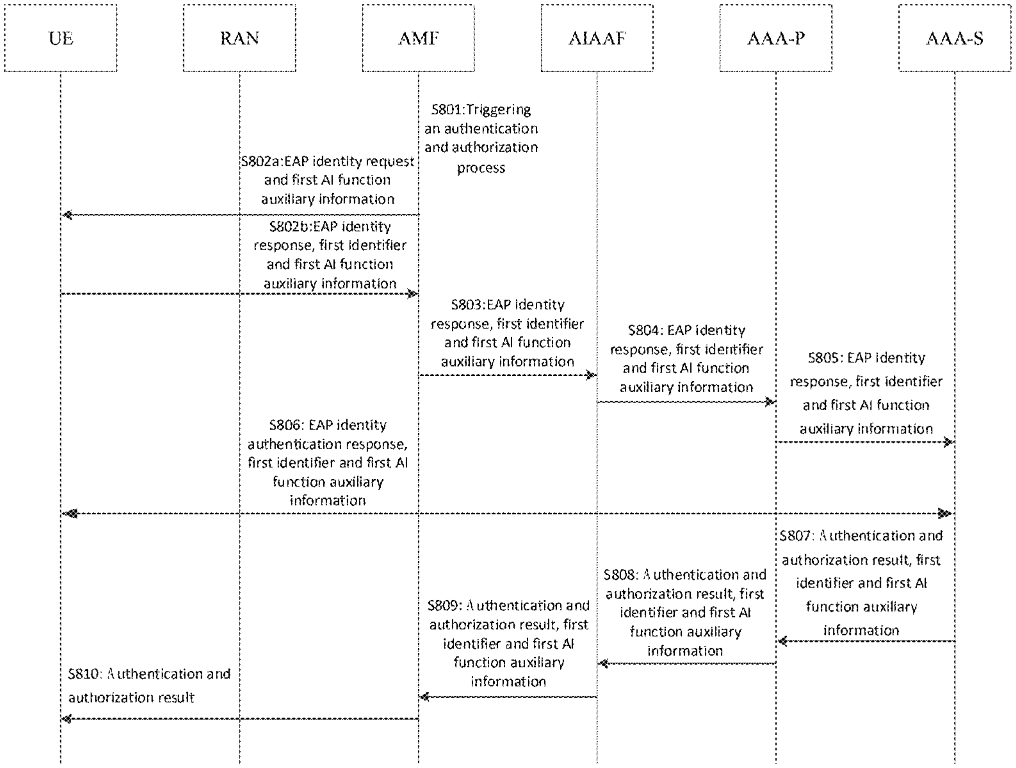
FIG. 8 is an interactive flow diagram of another method for authenticating and authorizing an AI function in a core network according to an example of the disclosure.

Referring to FIG. 8, FIG. 8 is an interactive flow diagram of another method for authenticating and authorizing an AI function in a core network according to an example of the disclosure. As shown in FIG. 8, the method may include, but is not limited to, the following steps: S801-S810.

In step S801, an AMF network element triggers an authentication and authorization process for an AI function of an AI function network element that requires authentication and authorization processing.

In step S802*a*, a first NAS MM Transport message is sent to a terminal device by the AMF network element, where the first NAS MM Transport message includes an EAP identity request and first AI function auxiliary information.

In step S802*b*, a second NAS MM transport message is sent to the AMF network element by the terminal device (UE), where the second NAS MM transport message includes an EAP identity response of the terminal device, a first identifier, and the first AI function auxiliary information.

In step S803, an AIAA_Authenticate Request is sent to an AIAAF network element by the AMF network element, where the AIAA_Authenticate request includes the first identifier and the first AI function auxiliary information.

In step S804, a first AAA Protocol message is sent to an AAA-P network element by the AIAAF network element, where the first AAA Protocol message includes an EAP identity response of the terminal device, the first identifier, and the first AI function auxiliary information.

In step S805, the first AAA Protocol message is sent to an AAA-S network element by the AAA-P network element, where the first AAA Protocol message includes the EAP identity response of the terminal device, the first identifier, and the first AI function auxiliary information.

In step S806, the AAA S-network element interacts with the terminal device to obtain a second AAA Protocol message, where the second AAA Protocol message includes an EAP identity authentication response (EAP message), the first identifier, and the first AI function auxiliary information.

In step S807, a third AAA Protocol message is sent to the AAA-P network element by the AAA-S network element, where the third AAA Protocol message includes an authentication and authorization result (EAP result), the first identifier, and the first AI function auxiliary information.

In step S808, the third AAA Protocol message is sent to the AIAAF network element by the AAA-P network element, where the third AAA Protocol message includes the authentication and authorization result, the first identifier, and the first AI function auxiliary information.

In step S809, an AIAA_Authenticate Response (AIAA_Authenticate Resp) is sent to the AMF network element by the AIAAF network element, where the AIAA_Authenticate Response includes the authentication and authorization result, the first identifier and the first AI function auxiliary information.

In step S810, a third NAS MM transport message is sent to the terminal device by the AMF network element, where the third NAS MM transport message includes the authentication and authorization result.

In the above examples of the disclosure, the methods provided in the examples of the disclosure are introduced respectively from the perspectives of the network device and the first terminal device. In order to achieve the functions in the methods provided by the above examples of the disclosure, the network device and the first terminal device may include a hardware structure and a software structure, and the above functions are achieved in the form of the hardware structure, the software module, or the hardware structure and the software module. One function of the above functions is performed in the form of the hardware structure, the software module or the hardware structure and the software module.

Figure 9:
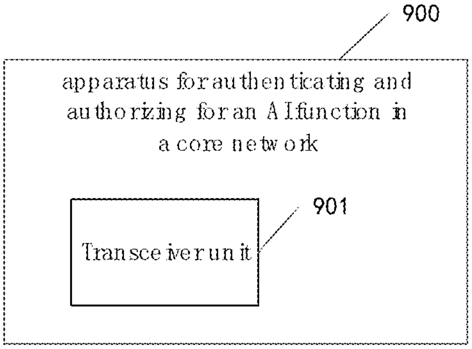
FIG. 9 is a schematic structural diagram of an apparatus for authenticating and authorizing an AI function in a core network according to an example of the disclosure.

Referring to FIG. 9, FIG. 9 is a schematic structural diagram of an apparatus 900 for authenticating and authorizing an AI function in a core network according to an example of the disclosure. The apparatus is performed by an AMF network element. The apparatus includes a transceiver unit 901, used to send an authentication and authorization request to an AAA-S network element, where the authentication and authorization request includes a first identifier of a specified terminal device and first AI function auxiliary information; and the transceiver unit 901 is further used to receive an authentication and authorization response returned by the AAA-S network element, where the authentication and authorization response includes an authentication and authorization result that is used to indicate whether the specified terminal device is allowed to use an AI function corresponding to the first AI function auxiliary information.

In one implementation, the authentication and authorization request further includes an EAP identity response of the specified terminal device that is used to authenticate the specified terminal device.

In one implementation, the transceiver unit 901 is further used to send a first message to at least one candidate terminal device, where the first message includes an EAP identity request and the first AI function auxiliary information; and the at least one candidate terminal device includes the specified terminal device; and receive a second message returned by the specified terminal device, where the second message includes the EAP identity response of the specified terminal device, the first identifier, and the first AI function auxiliary information.

In one implementation, the first message and the second message are NAS MM transport messages.

In one implementation, the transceiver unit 901 is specifically used to send an AIAA_Authenticate request to an AIAAF network element, where the AIAA_Authenticate request includes the first identifier and the first AI function auxiliary information, where the first AI function auxiliary information includes an address of the AAA-S network element that is used to indicate the AIAAF network element to send the authentication and authorization request to the AAA-S network element according to the address.

In one implementation, the transceiver unit 901 is specifically used to receive a third message returned by the AAA-S network element, where the third message includes the authentication and authorization result, a second identifier and second AI function auxiliary information; and determine the third message as the authentication and authorization response when the second identifier and the first identifier are consistent and the second AI function auxiliary information and the first AI function auxiliary information are consistent.

Figure 10:
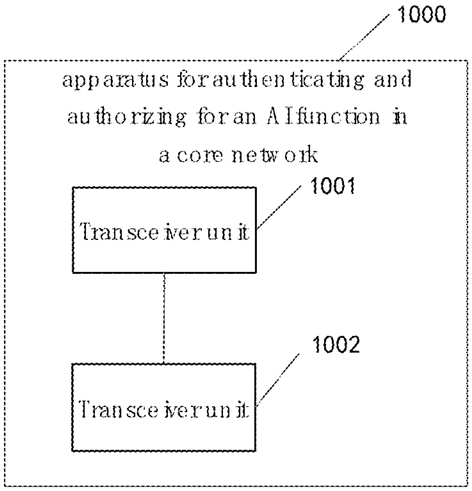
FIG. 10 is a schematic structural diagram of another apparatus for authenticating and authorizing an AI function in a core network according to an example of the disclosure.

Referring to FIG. 10, FIG. 10 is a schematic structural diagram of another apparatus 1000 for authenticating and authorizing an AI function in a core network according to an example of the disclosure. The apparatus is applied to an AAA-S network element. The apparatus includes a transceiver unit 1001, used to receive an authentication and authorization request sent by an AMF network element, where the authentication and authorization request includes a first identifier of a specified terminal device and first AI function auxiliary information. The transceiver unit 1001 is further used to send an authentication and authorization response to the AMF network element, where the authentication and authorization response includes an authentication and authorization result that is used to indicate whether the specified terminal device is allowed to use an AI function corresponding to the first AI function auxiliary information.

In one implementation, the authentication and authorization request further includes an EAP identity response of the specified terminal device that is used to authenticate the specified terminal device.

In one implementation, the transceiver unit 1001 is specifically used to receive the authentication and authorization request sent by an AIAAF network element, where the authentication and authorization request is sent by the AIAAF network element according to an AIAA_Authenticate request received from the AMF network element. The AIAA_Authenticate request includes the first identifier and the first AI function auxiliary information, and the first AI function auxiliary information includes an address of the AAA-S network element that is used to indicate the AIAAF network element to send the authentication and authorization request to the AAA-S network element according to the address.

In one implementation, the transceiver unit 1001 is specifically used to send a third message to the AMF network element, where the third message includes the authentication and authorization result, the first identifier and the first AI function auxiliary information.

In one implementation, the apparatus further includes: a processing unit 1002; the transceiver unit 1001 is further used to send a fourth message to the specified terminal device, where the fourth message includes an EAP identity authentication request, the first identifier, and the first AI function auxiliary information; the transceiver unit 1001 is further used to receive a fifth message returned by the specified terminal device, where the fifth message includes an EAP identity authentication response, the first identifier and the first AI function auxiliary information; and the processing unit 1002 is used to determine, according to the EAP identity authentication response, whether the specified terminal device is allowed to use the AI function corresponding to the first AI function auxiliary information.

In one implementation, the processing unit 1002 is further used to store an association relationship among the first identifier, the first AI function auxiliary information, and the authentication and authorization result.

Figure 11:
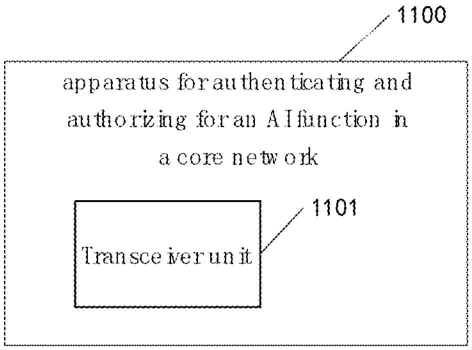
FIG. 11 is a schematic structural diagram of another apparatus for authenticating and authorizing an AI function in a core network according to an example of the disclosure.

Referring to FIG. 11, FIG. 11 is a schematic structural diagram of another apparatus 1100 for authenticating and authorizing an AI function in a core network according to an example of the disclosure. The apparatus is applied to a terminal device. The apparatus includes: a transceiver unit 1101, used to receive a first message sent by an AMF network element, where the first message includes an EAP identity request and first AI function auxiliary information; the transceiver unit 1101 is further used to return a second message to the AMF network element, where the second message includes a first identifier of the terminal device, an EAP identity response and the first AI function auxiliary information; and the EAP identity response is used to authenticate the terminal device; and the transceiver unit 1101 is further used to receive a sixth message sent by the AMF network element, where the sixth message includes an authentication and authorization result that is used to indicate whether the specified terminal device is allowed to use an AI function corresponding to the first AI function auxiliary information.

In one implementation, the first message and the second message are NAS MM transport messages.

In one implementation, the transceiver unit 1101 is further used to receive a fourth message sent by an AAA-S network element, where the fourth message includes an EAP identity authentication request, the first identifier, and the first AI function auxiliary information; and return a fifth message to the AAA-S network element, where the fifth message includes an EAP identity authentication response, the first identifier and the first AI function auxiliary information. The EAP identity authentication response is used to determine whether the terminal device is allowed to use the AI function corresponding to the first AI function auxiliary information.

It should be noted that the explanation of the methods performed on the AMF network element side in any one example of FIG. 2 to FIG. 3 above is also applicable to the authentication and authorization apparatus 900 for the AI function in the core network of this example, or, the explanation of the methods performed on the AAA-S network element side in any one example of FIG. 4 to FIG. 5 above is also applicable to the authentication and authorization apparatus 1000 for the AI function in the core network of this example, or, the explanation of the methods performed on the terminal device side in any one example of FIG. 6 to FIG. 7 above is also applicable to the authentication and authorization apparatus 1100 for the AI function in the core network of this example. The implementation principle is similar and will not be repeated here.

Figure 12:
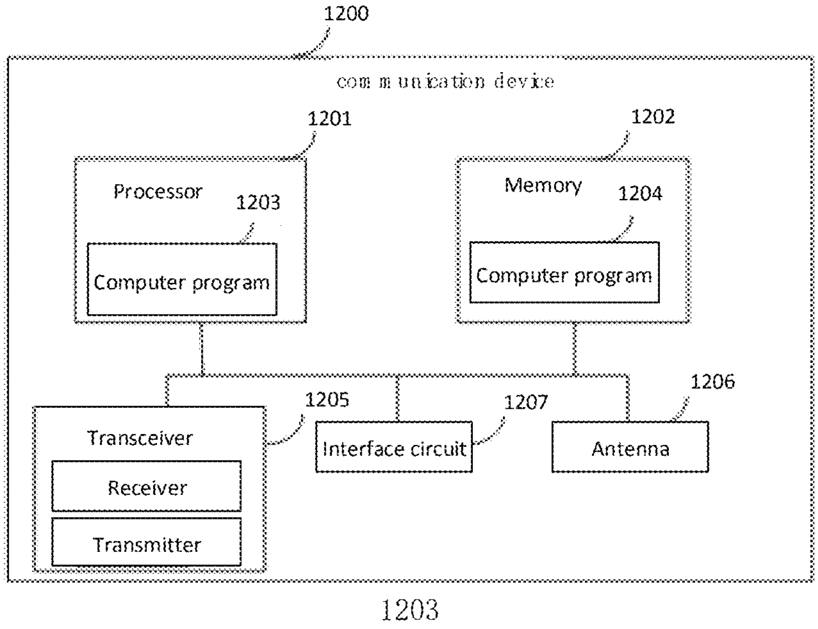
FIG. 12 is a schematic structural diagram of a communication device according to an example of the present disclosure.

Referring to FIG. 12, FIG. 12 is a schematic structural diagram of a communication device 1200 according to an example of the disclosure. The communication device 1200 may be a network device, a terminal device, a chip, a system-on-chip, or a processor that supports the network device to perform the above method, or may be a chip, a system-on-chip, or a processor that supports the terminal device to perform the above method. The communication device may be used to perform the methods described in the above method examples, and for details, reference may be made to the descriptions in the above method examples.

The communication device 1200 may include one or more processors 1201. The processor 1201 may be a general-purpose processor, or a dedicated processor, etc. For example, the processor may be a baseband processor or a central processor. The baseband processor can be used to process communication protocols and communication data, and the central processor can be used to control the communication device (such as base stations, baseband chips, terminal devices, terminal device chips, DU or CU, etc.), execute computer programs, and process computer program data.

Optionally, the communication device 1200 may further include one or more memories 1202 on which a computer program 1204 may be stored, and the processor 1201 executes the computer program 1204 to cause the communication device 1200 to perform the methods described in the above method examples. Optionally, data may also be stored in the memory 1202. The communication device 1200 and the memory 1202 can be arranged separately or integrated together.

Optionally, the communication device 1200 may further include a transceiver 1205 and an antenna 1206. The transceiver 1205 may be called a transceiver unit, a transmitter-receiver, or a transceiver circuit, etc., to implement the transceiver function. The transceiver 1205 may include a receiver and a transmitter, and the receiver may be called a receiving machine or a receiving circuit, etc., used to achieve the receiving function; and the transmitter may be called a transmitting machine or a transmitting circuit, etc., used to achieve the transmitting function.

Optionally, the communication device 1200 may further include one or more interface circuits 1207. The interface circuit 1207 is used to receive code instructions and transmit the code instructions to the processor 1201. The processor 1201 executes the code instructions to cause the communication device 1200 to perform the methods described in the above method examples.

The communication device 1200 is an AMF network element, and the transceiver 1205 is used to perform steps S201 to S202 in FIG. 2, and steps S301 to S304 in FIG. 3.

The communication device 1200 is an AAA-S network element, and the transceiver 1205 is used to perform steps S401 to S402 in FIG. 4, and steps S501 to S503 and step S505 in FIG. 5. The processor 1201 is used to perform step S504 in FIG. 5.

The communication device 1200 is a terminal device, and the transceiver 1205 is used to perform steps S601 to S603 in FIG. 6, and steps S701 to S702 in FIG. 7.

In one implementation, the processor 1201 may include a transceiver used to achieve the receiving and transmitting functions. For example, the transceiver may be a transceiver circuit, an interface, or an interface circuit. The transmitter circuit, the interface, or the interface circuit used to achieve the receiving and transmitting functions may be separate or integrated together. The transceiver circuit, the interface or the interface circuit may be used to read and write code/data, or the transceiver circuit, the interface or the interface circuit may be used for transmission or transfer of signals.

In one implementation, the processor 1201 may store a computer program 1203, where the computer program 1203, when executed by the processor 1201, causes the communication device 1200 to perform the methods described in the above method examples. The computer program 1203 may be solidified in the processor 1201, in which case the processor 1201 may be implemented by hardware.

In one implementation, the communication device 1200 may include a circuit that can achieve the function of transmitting, receiving, or communicating in the above method examples. The processor and the transceiver described in the disclosure can be implemented in an integrated circuit (IC), an analog IC, a radio-frequency integrated circuit (RFIC), a mixed-signal IC, an application-specific integrated circuit (ASIC), a printed circuit board (PCB), an electronic device, etc. The processor and the transceiver can also be manufactured with various IC process technologies, such as a complementary metal oxide semiconductor (CMOS), n-metal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

The communication device described in the above example may be a network device or a terminal device. Still, the scope of the communication device described in the disclosure is not limited to that, and the structure of the communication device may not be limited to that shown in FIG. 12. The communication device may be an independent device or part of a larger device. For example, the communication device may be any one of the following (1) to (6).

(1) An independent integrated circuit (IC), a chip, a system-on-chip, or a subsystem.

(2) A collection having one or more ICs; optionally, the IC collection may also include a storage component for storing data and computer programs.

(3) An ASIC, such as a modem.

(4) A module that can be embedded in other devices.

(5) A receiver, a terminal device, an intelligent terminal device, a cellular phone, a wireless device, a handheld phone, a mobile unit, a vehicle device, a network device, a cloud device, an artificial intelligence device, or the like.

(6) Other devices.

Figure 13:
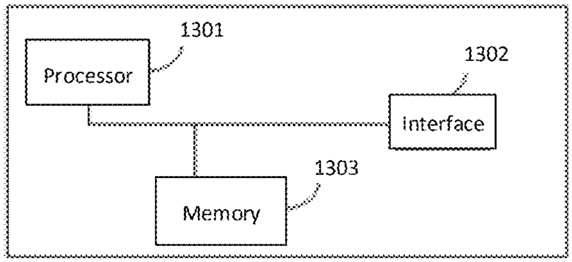
FIG. 13 is a schematic structural diagram of a chip according to an example of the present disclosure.

For the case where the communication device may be a chip or a system-on-chip, see the schematic structural diagram of a chip structure shown in FIG. 13. The chip shown in FIG. 13 includes a processor 1301 and an interface 1302. One or more processors 1301 may be provided, and a plurality of interfaces 1302 may be provided.

Optionally, the chip further includes a memory 1303, used to store necessary computer programs and data.

Those skilled in the art may also understand that the various illustrative logical blocks and steps listed in the examples of the disclosure may be implemented by electronic hardware, computer software, or a combination of both. Whether such functionality is achieved via hardware or software depends on the specific application and the design requirements of the overall system. Those skilled in the art may implement the described functionality in various ways for each particular application. Still, such implementations should not be interpreted as causing a departure from the scope of protection of the examples of the disclosure.

The disclosure further provides a non-transitory readable storage medium storing instructions, where the instructions, when executed by a computer, cause the computer to implement the function of any one of the method examples above.

The disclosure further provides a computer program product, and the computer program product, when executed by a computer, implements the function of any one of the method examples above.

In the above examples, the function may be implemented in whole or in part by software, hardware, firmware, or any combination of them. When implemented using software, it may be implemented in whole or in part in the form of the computer program product. The computer program product includes one or more computer programs. When the computer program is loaded and executed by the computer, a process or function according to the examples of the disclosure is implemented in whole or in part. The computer may be a general-purpose computer, a specialized computer, a computer network, or other programmable apparatus. The computer program may be stored in a non-transitory computer-readable storage medium or transmitted from one non-transitory computer-readable storage medium to another non-transitory computer-readable storage medium. For example, the computer program may be transmitted from a website, computer, server, or data center to another website, computer, server, or data center in a wired (e.g., a coaxial cable, an optical fiber, and a digital subscriber line (DSL)) or wireless (e.g., infrared, wireless, and microwave) manner. The non-transitory computer-readable storage medium may be any available medium accessible to a computer, or an integrated data storage device such as a server or a data center that includes one or more available media. The available medium may be a magnetic medium (e.g., a floppy disk, a hard disk, or a magnetic tape), an optical medium (e.g., a high-density digital video disc (DVD)), or a semiconductor medium (e.g., a solid-state disk (SSD)).

It can be understood by those of ordinary skill in the art that the various numbers of first, second, etc., referred to in the disclosure are only for the purpose of convenient description, are not used to limit the scope of the examples of the disclosure, and also represent the sequence.

At least one in the disclosure can also be described as one or more, which may be two, three, four, or more, which is not limited to the disclosure. In the examples of the disclosure, for a technical feature, the technical features of this technical feature are distinguished by "first," "second," "third," "A," "B," "C," and "D", etc., and the technical features described by "first," "second," "third," "a," "B," "C," and "D" have no order of precedence or magnitude.

The corresponding relationships shown in the tables in the disclosure may be configured or predefined. The values of the information in each table are only examples and may be configured as other values, which are not limited to the disclosure. When configuring the corresponding relationship between information and parameters, it is not necessary to configure all the corresponding relationships shown in each table. For example, in the tables of the disclosure, the corresponding relationships shown in some rows may also not be configured. For another example, appropriate deformation adjustments may be made based on the above table, such as splitting and merging. The names of the parameters shown in the headings of the above tables may also adopt other names understandable by the communication device, and the values or expressions of the parameters may also be other values or expressions understandable by the communication device. The above tables may also be implemented using other data structures, such as arrays, queues, containers, stacks, linear tables, pointers, linked lists, trees, graphs, structures, classes, heaps, or hash tables.

Pre-defined in the disclosure may be understood as defined, pre-defined, stored, pre-stored, pre-negotiated, pre-configured, cured, or pre-fired.

Those of ordinary skill in the art will appreciate that the elements and algorithm steps of the examples described in combination with the examples disclosed here may be implemented by electronic hardware, or a combination of computer software and electronic hardware. Whether to implement such functionality with hardware or software depends upon the particular application of the technical solutions and constraint conditions of the design. Those skilled in the art may implement the described functionality in varying ways for each particular application, but such implementation should not be interpreted as causing a departure from the scope of the disclosure.

Those skilled in the art can clearly understand that for the convenience and simplicity of description, the specific working processes of the system, apparatus and unit described above can refer to the corresponding process in the above-mentioned examples of the method, and will not be repeated here.

Although only the specific implementations of the disclosure have been described above, the scope of protection of the disclosure is not limited to this, and any changes or substitutions which can be easily conceived by those skilled in the art within the technical scope disclosed in the disclosure should be covered by the scope of protection of the disclosure. Accordingly, the scope of protection of the disclosure shall be as set forth in the claims.

The invention claimed is:

1. A method for authenticating and authorizing an artificial intelligence (AI) function in a core network, wherein the method is performed by an access and mobility management function (AMF) network element, the method comprising:

sending an authentication and authorization request to an authentication and authorization server (AAA-S) network element, wherein the authentication and authorization request comprises a first identifier of a specified terminal device and first AI function auxiliary information, and the first AI function auxiliary information comprises an address of an AAA-S network element for receiving the authentication and authorization request; and receiving an authentication and authorization response returned by the AAA-S network element, wherein the authentication and authorization response comprises an authentication and authorization result, and the authentication and authorization result is obtained by the AAA-S network element performing authentication and authorization processing for an AI function corresponding to the first AI function auxiliary information, and is used to indicate whether the specified terminal device is allowed to use the AI function corresponding to the first AI function auxiliary information;

wherein there are a plurality of AAA-S network elements and a plurality of AI functions, and different AAA-S network elements perform the authentication and authorization processing for different AI functions.

2. The method according to claim 1, wherein the authentication and authorization request further comprises an extensible authentication protocol (EAP) identity response of the specified terminal device that is used to authenticate the specified terminal device.

3. The method according to claim 1, wherein before sending the authentication and authorization request to the AAA-S network element, the method further comprises:

sending a first message to at least one candidate terminal device, wherein the first message comprises an EAP identity request and the first AI function auxiliary information, and the at least one candidate terminal device comprises the specified terminal device; and receiving a second message returned by the specified terminal device, wherein the second message comprises an EAP identity response of the specified terminal device, the first identifier, and the first AI function auxiliary information.

4. The method according to claim 3, wherein the first message and the second message are non-access stratum mobility management (NAS MM) transport messages.

5. The method according to claim 1, wherein sending the authentication and authorization request to the AAA-S network element comprises:

sending an artificial intelligence authentication and authorization (AIAA) Authenticate request to an artificial intelligence authentication and authorization function (AIAAF) network element, wherein the AIAA_Authenticate request comprises the first identifier and the first AI function auxiliary information, and wherein the first AI function auxiliary information is used to indicate the AIAAF network element to send the authentication and authorization request to the AAA-S network element for receiving the authentication and authorization request according to the address.

6. The method according to claim 1, wherein receiving the authentication and authorization response returned by the AAA-S network element comprises:

receiving a third message returned by the AAA-S network element, wherein the third message comprises the authentication and authorization result, a second identifier, and second AI function auxiliary information, wherein the second AI function auxiliary information comprises an address of an AAA-S network element for returning the authentication and authorization response; and determining the third message as the authentication and authorization response, in a case where the second identifier and the first identifier are consistent, and the second AI function auxiliary information and the first AI function auxiliary information are consistent.

7. The method according to claim 1, wherein the authentication and authorization request is sent to the AAA-S network element by an AIAAF network element according to an AIAA_Authenticate request received from the AMF network element; and the AIAA_Authenticate request comprises the first identifier and the first AI function auxiliary information, and the first AI function auxiliary information is used to indicate the AIAAF network element to send the authentication and authorization request to the AAA-S network element for receiving the authentication and authorization request according to the address.

8. The method according to claim 1, wherein the AAA-S network element is further configured to:

send a fourth message to the specified terminal device, wherein the fourth message comprises an EAP identity authentication request, the first identifier, and the first AI function auxiliary information;

receive a fifth message returned by the specified terminal device, wherein the fifth message comprises an EAP identity authentication response, the first identifier, and the first AI function auxiliary information; and determine, according to the EAP identity authentication response, whether the specified terminal device is allowed to use the AI function corresponding to the first AI function auxiliary information.

9. The method according to claim 1, wherein the AAA-S network element is further configured to:

store an association relationship among the first identifier, the first AI function auxiliary information, and the authentication and authorization result.

10. The method according to claim 1, wherein the specified terminal device is further configured to:

receive a sixth message sent by the AMF network element, wherein the sixth message comprises the authentication and authorization result.

11. A communication device, comprising:

one or more processors and a memory that stores processor-executable instructions, wherein the processor-executable instructions, when collectively executed by the one or more processors, cause the communication device to;

send an authentication and authorization request to an authentication and authorization server (AAA-S) network element, wherein the authentication and authorization request comprises a first identifier of a specified terminal device and first artificial intelligence (AI) function auxiliary information, and the first AI function auxiliary information comprises an address of an AAA-S network element for receiving the authentication and authorization request; and receive an authentication and authorization response returned by the AAA-S network element, wherein the authentication and authorization response comprises an authentication and authorization result, and the authentication and authorization result is obtained by the AAA-S network element performing authentication and authorization processing for an AI function corresponding to the first AI function auxiliary information, and is used to indicate whether the specified terminal device is allowed to use the AI function corresponding to the first AI function auxiliary information;

wherein there are a plurality of AAA-S network elements and a plurality of AI functions, and different AAA-S network elements perform the authentication and authorization processing for different AI functions.

12. A non-transitory computer-readable storage medium storing instructions, wherein the instructions, when executed by a processor, cause the processor to:

send an authentication and authorization request to an authentication and authorization server (AAA-S) network element, wherein the authentication and authorization request comprises a first identifier of a specified terminal device and first artificial intelligence (AI) function auxiliary information, and the first AI function auxiliary information comprises an address of an AAA-S network element for receiving the authentication and authorization request; and receive an authentication and authorization response returned by the AAA-S network element, wherein the authentication and authorization response comprises an authentication and authorization result, and the authentication and authorization result is obtained by the AAA-S network element performing authentication and authorization processing for an AI function corresponding to the first AI function auxiliary information, and is used to indicate whether the specified terminal device is allowed to use the AI function corresponding to the first AI function auxiliary information;

wherein there are a plurality of AAA-S network elements and a plurality of AI functions, and different AAA-S network elements perform the authentication and authorization processing for different AI functions.

* * * * *